(12) United States Patent
Sousa et al.

(10) Patent No.: US 12,339,345 B2
(45) Date of Patent: Jun. 24, 2025

(54) WATER CATCHER FOR BEACON

(71) Applicant: Sheaumann Laser, Inc., Billerica, MA (US)

(72) Inventors: John Gary Sousa, Nashua, NH (US); Andrew Carlin, Acton, MA (US); James Skinner, Medford, MA (US)

(73) Assignee: Sheaumann Laser, Inc., Billerica, MA (US)

( * ) Notice: Subject to any disclaimer, the term of this patent is extended or adjusted under 35 U.S.C. 154(b) by 0 days.

(21) Appl. No.: 18/185,606

(22) Filed: Mar. 17, 2023

(65) Prior Publication Data
US 2023/0305092 A1 Sep. 28, 2023

Related U.S. Application Data

(60) Provisional application No. 63/322,305, filed on Mar. 22, 2022.

(51) Int. Cl.
G01S 1/70 (2006.01)
G02B 5/00 (2006.01)

(52) U.S. Cl.
CPC ............ *G01S 1/7034* (2019.08); *G02B 5/001* (2013.01)

(58) Field of Classification Search
CPC .. G01S 1/7034; G02B 5/001; H04Q 2209/43; H04Q 2209/823
See application file for complete search history.

(56) References Cited

U.S. PATENT DOCUMENTS

| | | | | |
|---|---|---|---|---|
| 2007/0008712 A1* | 1/2007 | Schnitzer | ................. | B63C 9/20 |
| | | | | 362/96 |
| 2011/0042533 A1* | 2/2011 | Austin | ...................... | A45F 5/02 |
| | | | | 248/220.21 |
| 2015/0263806 A1* | 9/2015 | Puscasu | ................. | F41H 13/00 |
| | | | | 398/130 |

FOREIGN PATENT DOCUMENTS

GB 2224343 A * 5/1990 ............... B63C 9/20

* cited by examiner

*Primary Examiner* — Sisay Yacob
(74) *Attorney, Agent, or Firm* — HoustonHogle LLP

(57) ABSTRACT

A beacon with a preferably anodized aluminum body, cylindrical in shape, and threaded. The exact diameter and thread size of a water catcher cap is defined by the accompanying MWIR/LWIR beacon it threads onto. The accompanying component male thread allows the water catching cover to be threaded down completely for when the MWIR/LWIR beacon is powered on, thus creating an IR iris for the beacon emission, also while cooling the MWIR/LWIR beacon by being able to capture water within its open space cavity between the accompanying component and the water catching cover wall. Further in a wet environment, the open nature of the water catching cover permits rapid quenching by ambient water and refill of water catcher. Alternatively, when thread in the upmost position it protects the accompanying MWIR/LWIR beacon point of emission.

1 Claim, 5 Drawing Sheets

WATER CATCHER FOR BEACON

RELATED APPLICATIONS

This application claims the benefit under 35 USC 119(e) of U.S. Provisional Application No. 63/322,305, filed on Mar. 22, 2022, which is incorporated herein by reference in its entirety.

BACKGROUND OF THE INVENTION

Deployable At-Sea Mid-Wave Infrared Emitter beacons provide visual position location for combat swimmer/diver personnel during rendezvous/extraction while in the ocean. The beacons often operate within the wavelength range of Mid-Wave and Long Wave Infrared (MWIR/LWIR), which is often defined as 2.0-12.5 µm. Compatible imaging and sensing systems are then employed by pilots or spotters on ships, for example, to see and locate the beacons.

The MWIR/LWIR beacons emit in a "halo" of 360°. The halo emission also emits as a divergent output in azimuth both in the positive (towards the sky) and negative directions (towards the ground or ocean surface). FIG. 1A shows the beacon powered off and FIG. 1B shows the beacon on, with its cover screwed down and exposing the axicon.

FIGS. 2A and 2B are a side plan view and a side cross sectional view of the beacon 50.

Shown is the housing 1, the window cap 2, the cylindrical sapphire window, the base mount 4 including the quantum cascade laser (QCL), the contact pad 5, the QCL submount 6, the QCL housing mount 7; printed circuit board 8, battery compartment 10, end cap 11, locking sleeve 12, switch slide 13, switch slide lock 14, switch 15, wet pluggable connector 16, PCB at the top of the battery compartment 17, and PCB at the bottom of the battery compartment 18.

In operation, the beacon 50 is turned on by screwing the cover 9 down, which also serves as a protective cover when in the off position (fully threaded up) to protect the beacon if dropped.

SUMMARY OF THE INVENTION

The present invention relates to the MWIR/LWIR beacon and more specifically it anodized aluminum body. The body includes one or more of the following features an attachment point and/or grooved outer wall designed such that a gloved hand can handle it and easily rotate it and/or female threads and wall height as defined by accompanying MWIR/LWIR beacon and/or shelf spacing to capture water for cooling of the accompanying MWIR/LWIR beacon.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 1A is a side perspective views showing a beacon powered off and FIG. 1B is a side perspective view showing the beacon powered on;

DESCRIPTION OF THE PREFERRED EMBODIMENTS

Figure 1A:
Figure 1B:
Figure 2A:
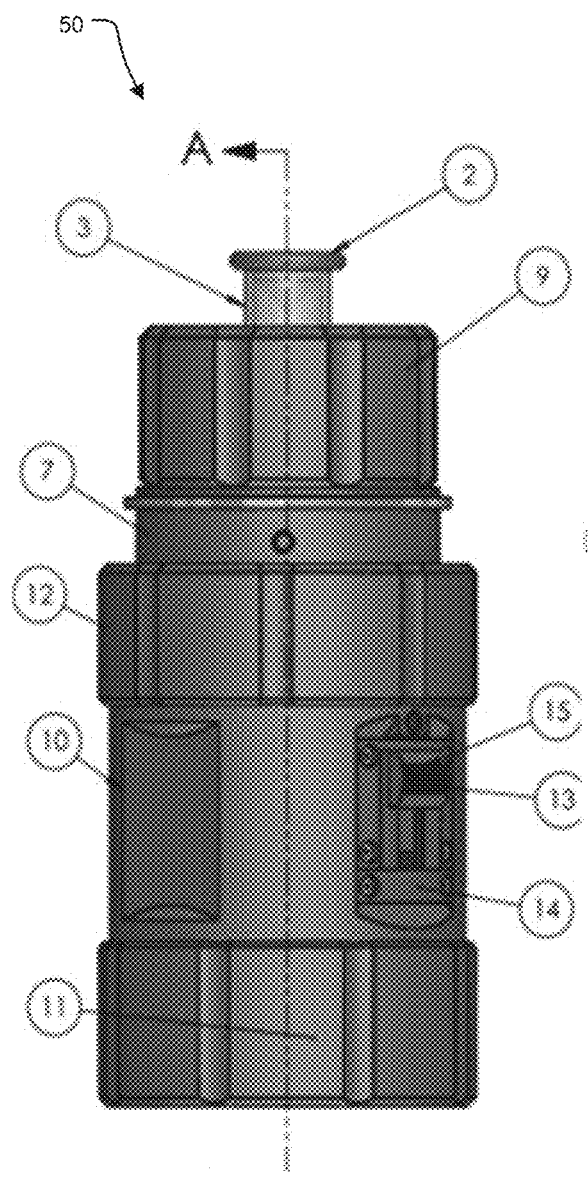
FIGS. 2A and 2B are a side plan view and a side cross sectional view of the beacon.
Figure 2B:
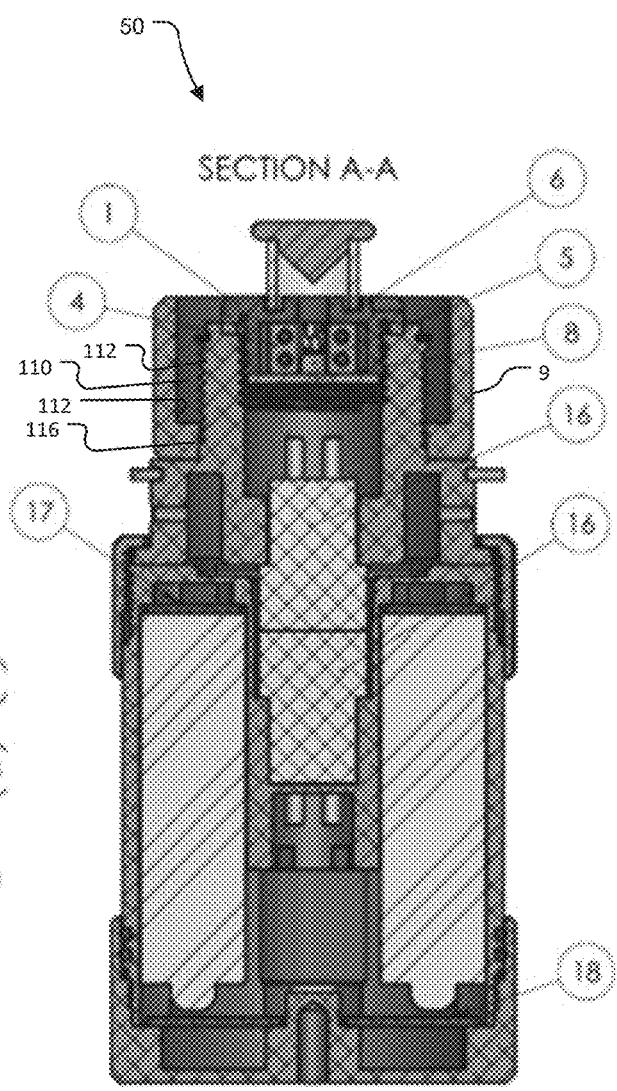

The present invention relates to a MWIR/LWIR beacon's anodized aluminum body, which is cylindrical in shape, and threaded, although other materials are suitable for this application. The exact diameter and female thread size of the inventive water catching cover 9 is dictated by the accompanying MWIR/LWIR beacon it threads onto. The accompanying component male threads 112 on the outer wall of the beacon 50 allows the water catching cover 9 to be rotated down completely by virtue of its female threads 116 on its lower end. When the MWIR/LWIR beacon is powered on, an emission iris is created for the beacon emission, also while cooling the MWIR/LWIR beacon by being able to capture water within its open space cavity or reservoir 110 between the outer wall 112 of the beacon's main body and the water catching cover's inner wall 112. Alternatively, when thread in the upmost position it protects the accompanying MWIR/LWIR beacon point of emission.

Figure 3:
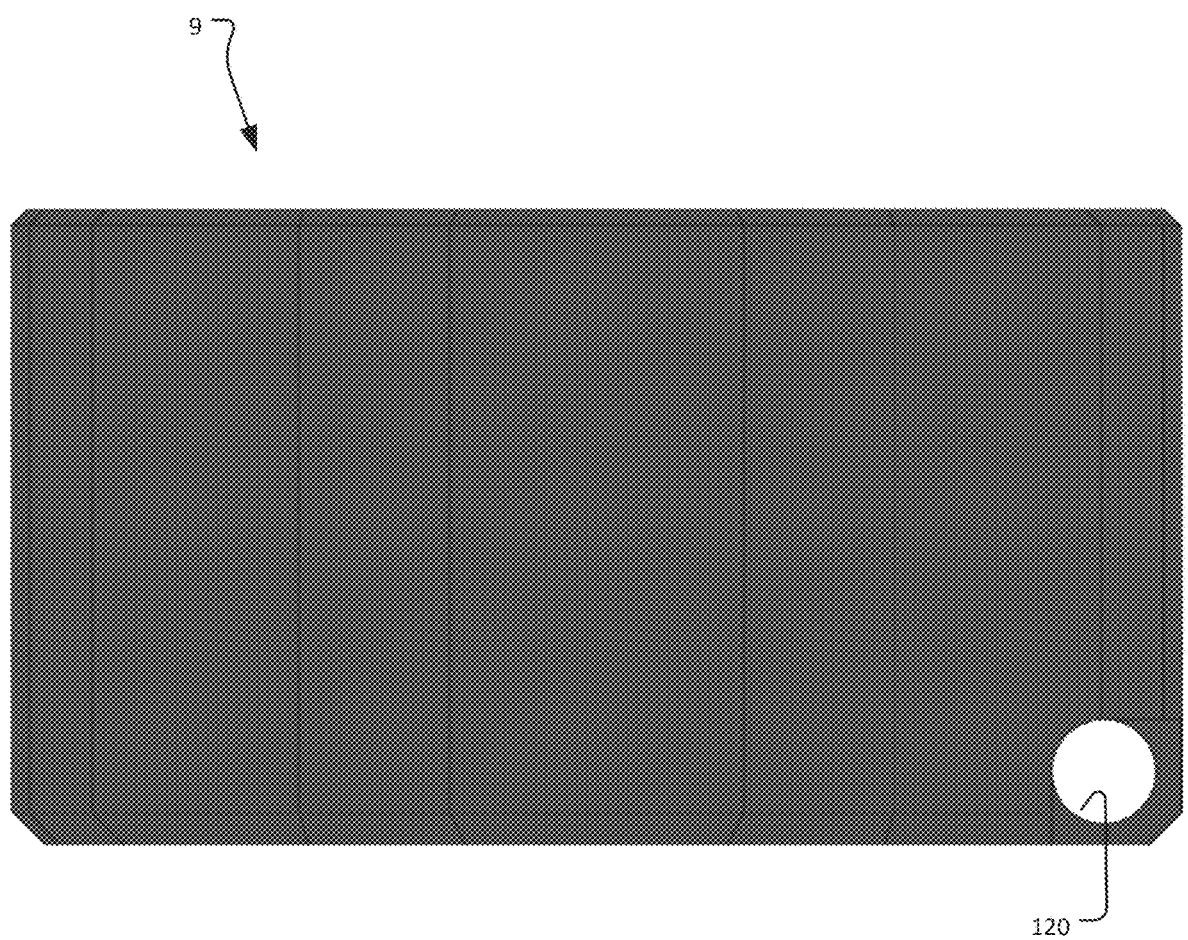
FIG. 3 is a front plan view of the water catching cover with a lanyard attachment point according to the invention.

FIG. 3 is a front plan view of the water catching cover 9 with the lanyard attachment point 120.

Figure 4:
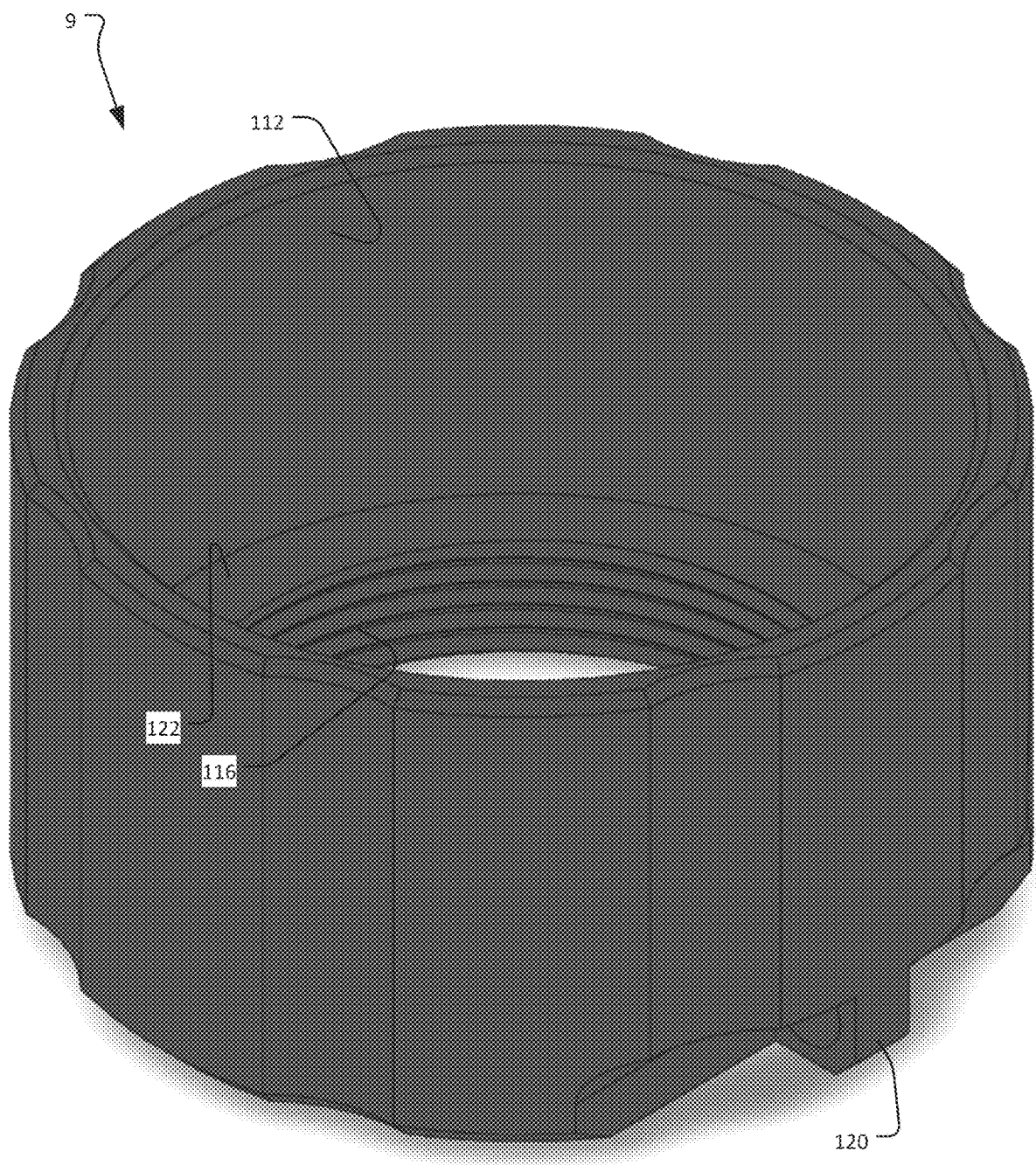
FIG. 4 is a perspective view of the water catching cover.

FIG. 4 is an isometric view of the water catching cover 9 showing its inner wall 112, shelf 122 and its female threads 116 that engage the male threads 112 on the outer wall of the beacon 50.

Figure 5:
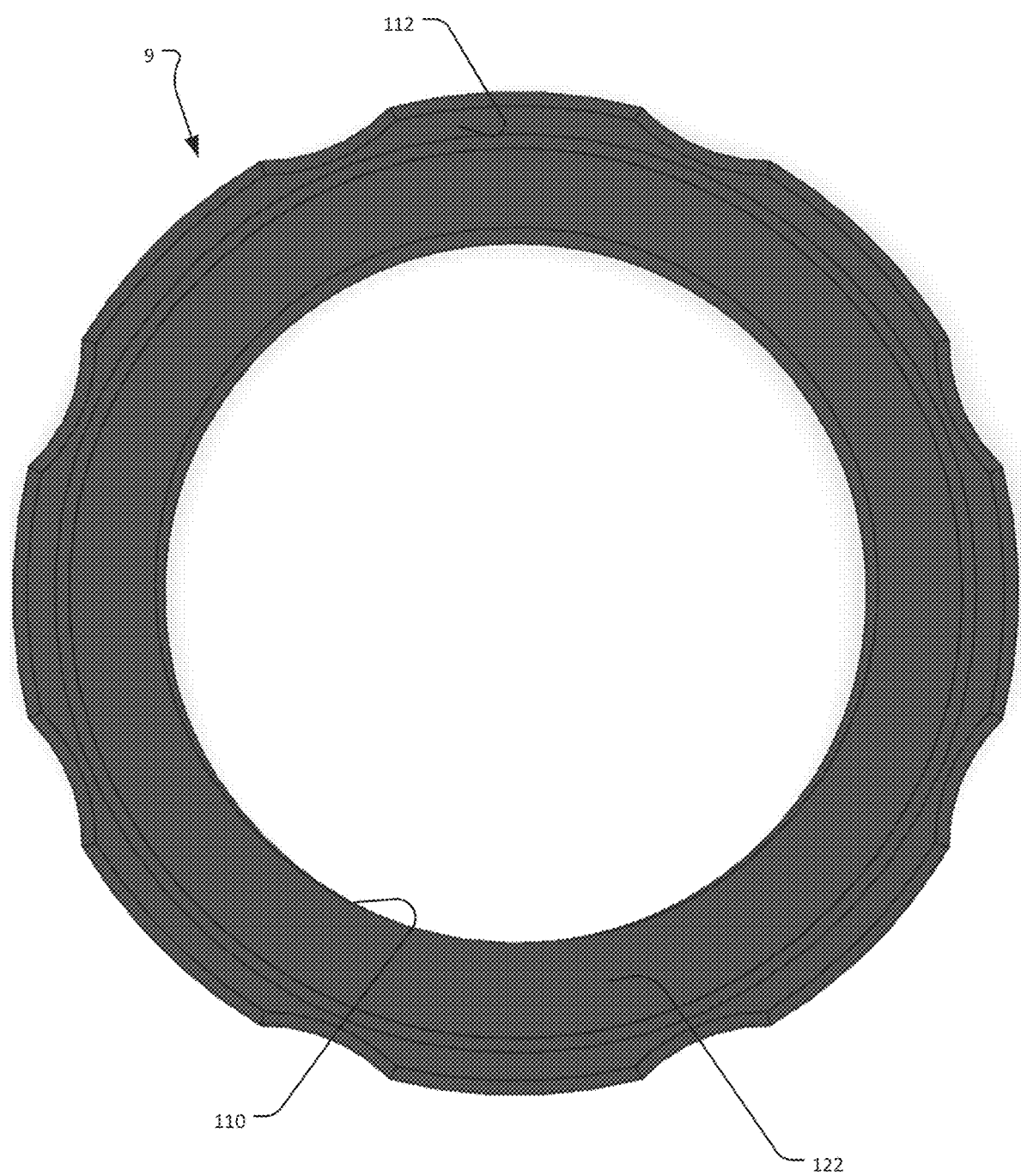
FIG. 5 is a top down view of the water catching cover.

FIG. 5 is a top down view showing the grip design on the outer periphery of the cover 9 that enables the users to easily thread the cap up and down both bare handed and with gloves on.

The attachment point 120, such as a lanyard, is useful for a wet environment, for example. The possible conditions could be cold, dark, and slippery for the MWIR/LWIR beacon 50, and handling it could be difficult without dropping or an accompanying fixture. This attachment point 120 allows the MWIR/LWIR beacon 50 to be attached to the user. This reduces the risk of damage or loss of the MWIR/LWIR beacon due to accidental dropping of it.

The water catching cover 9 is designed to be threaded onto the accompanying MWIR/LWIR beacon 50. The female thread size and length are defined by the accompanying MWIR/LWIR beacon male thread. The water catching cover 9 is meant to be threaded on such that the water catching cover can also protect the MWIR/LWIR beacon 50 when turned off or not in-use. When the MWIR/LWIR beacon is not in-use, the water catching cover 9 should be threaded to the upmost position to protect the point of emission of the MWIR/LWIR beacon, the point of emission is the most critical and likely the most fragile point of the MWIR/LWIR beacon. When thread in the up-most position, the water catching cover 50 should fully cover the point of emission and become the high-point of the assembly. This will make it the first point of contact in case of an accidental forceful contact, such as dropping it, in both a position where the MW/LWIR beacon is parallel or perpendicular to the point of contact.

FIG. 5 shows the shelf 122 of the water catching cover 9, this spacing from the threads which mate with the accompanying MWIR/LWIR beacon to the internal wall of the water catching cover. The shelf 122 creates a space for water to fill when water catching cover is fully threaded down and the MWIR/LWIR beacon is in operation. The shelf 122 is also what allows for a simple mechanical stop by the accompanying MWIR/LWIR beacon at both the upmost position and fully threaded down position. Additionally, the height of the water catching cover wall 112 is defined by the accompanying MWIR/LWIR beacon such that the height is defined to create a bottom iris relative to the MWIR/LWIR beacon's emission. Also captured in this view is the grip design structure of the outer wall, this is to allow for easy threading up and down of the water catching cover by any user, including when the user is wearing gloves. In general, according to one aspect, the invention features.

While this invention has been particularly shown and described with references to preferred embodiments thereof, it will be understood by those skilled in the art that various changes in form and details may be made therein without departing from the scope of the invention encompassed by the appended claims.

What is claimed is:

1. A Mid Wave Infrared or Long Wave Infrared (MWIR/LWIR) beacon comprising:
   a housing, a cylindrical window projecting from the housing, and a window cap on the cylindrical window;
   a water catching cover having cover threads mating with housing threads on the housing allowing the water catching cover to be threaded up and down to protect and expose the cylindrical window; wherein an inner profile of the water catching cover comprises a shelf projecting radially outward from a diameter of the cover threads to an inner wall projecting upward to provide space between the inner wall of the water catching cover and an outer profile capable of retaining water to cool the beacon;
   an attachment point comprising a ring integral with the water catching cover being recessed from an outer periphery of the water catching cover, an axis of a hole defined by the ring extending in a direction of a chord to outer periphery of the water catching cover; and
   grooved outer wall formed in an outer wall of the water catching cover such that a gloved hand can handle it and easily rotate it a.

\* \* \* \* \*